Figure 1:
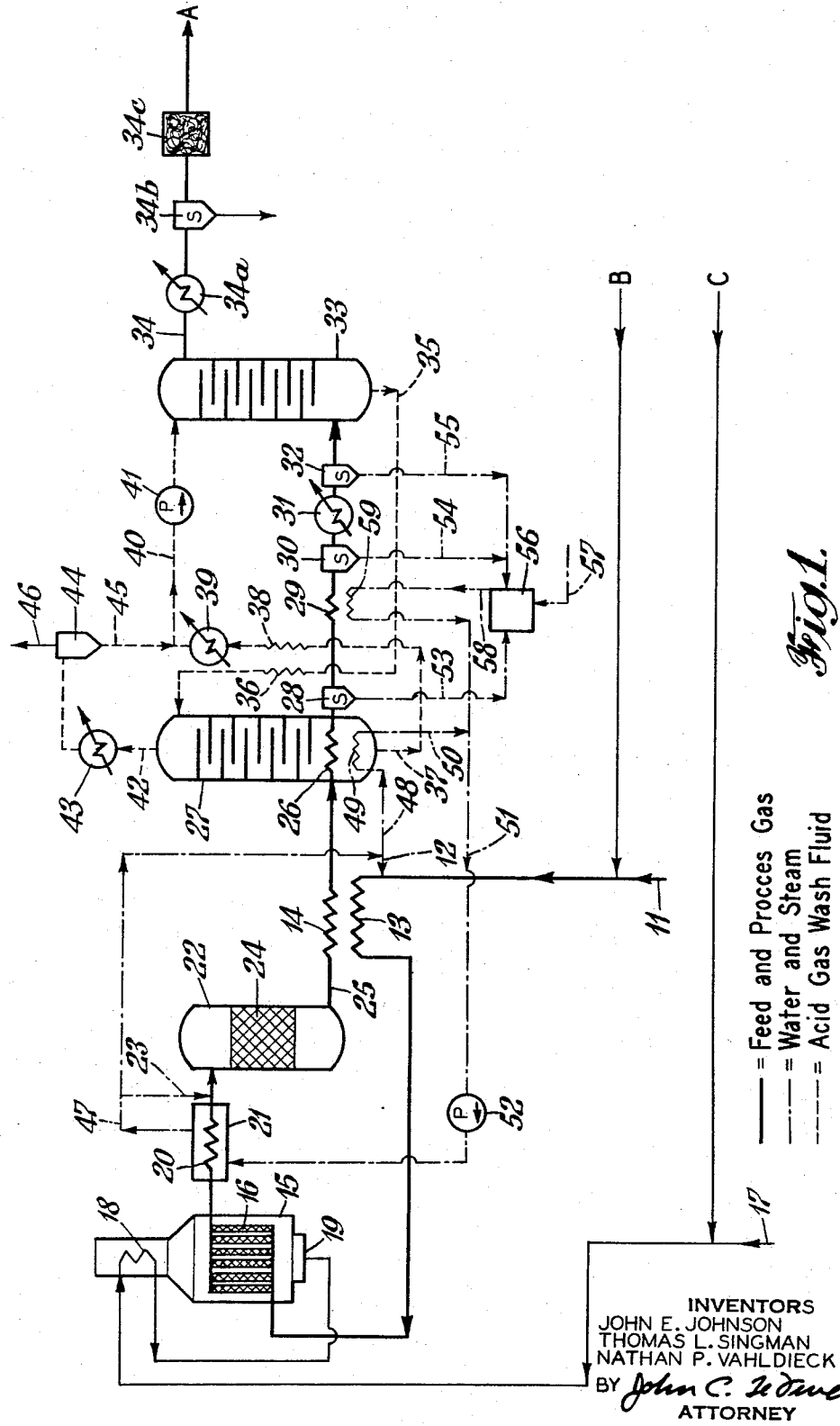

Jan. 2, 1968     J. E. JOHNSON ETAL     3,361,534
HYDROGEN PRODUCTION BY STEAM REFORMING
Filed March 31, 1965     3 Sheets-Sheet 1

INVENTORS
JOHN E. JOHNSON
THOMAS L. SINGMAN
NATHAN P. VAHLDIECK
BY John C. ...
ATTORNEY

United States Patent Office 3,361,534
Patented Jan. 2, 1968

3,361,534
HYDROGEN PRODUCTION BY STEAM REFORMING
John E. Johnson, Grand Island, Thomas L. Singman, Amherst, and Nathan P. Vahldieck, Snyder, N.Y., assignors to Union Carbide Corporation, a corporation of New York
Filed Mar. 31, 1965, Ser. No. 444,127
13 Claims. (Cl. 23—210)

This invention relates to an improved process for producing and purifying hydrogen employing steam reforming of hydrocarbon feed streams.

As currently practiced, hydrogen production by steam reforming involves three major steps: (1) steam reforming and water-gas shift; (2) removal of acid gases; and (3) removal of low boiling impurities. While various feed streams are employed, the ideal feed stream is rich in $C_1$–$C_3$ saturated hydrocarbons and low in hydrogen, nitrogen and unsaturated hydrocarbons. Natural gases of low nitrogen content make ideal feed streams for steam reforming. Refinery off-gas streams can also be employed as feed streams, but they may contain undesirable constituents such as hydrogen, nitrogen or unsaturated hydrocarbons.

In the steam reforming step, preheated feed gases and superheated steam are introduced into catalyst-filled tubes in the reformer, the tubes being heated externally by the combustion of fuel. At temperature of about 1400–1500° F. the hydrocarbons react with the steam to form hydrogen and oxides of carbon. The initial or reforming action can be represented by:

$$C_nH_{2n+2} + nH_2O \rightarrow nCO + (2n+1)H_2 \qquad (1)$$

The carbon monoxide formed can react with the excess steam in the feed mixture to form more hydrogen:

$$CO + H_2O \rightarrow CO_2 + H_2 \qquad (2)$$

This latter reaction is known as the water-gas shift reaction. The composition of the gases leaving the reformer depends on the degree of completion of these two reactions. Consideration of the thermodynamics of the reactions shows that the reforming reaction is promoted by reforming temperatures, low reforming pressures and excess steam. The water-gas shift reaction is promoted by low temperatures and excess steam and is unaffected by pressure. High reforming pressures are however usually employed when product hydrogen at high pressures is required. It is less expensive to compress the feed gas stream than the product gas stream because the feed gas volume is much less than the product gas volume. In addition, many natural gas streams are available at high pressures.

Steam reformers are presently operated so as to minimize the methane content of the effluent stream. Methane is the only hydrocarbon stable enough to be present in the effluent stream. The methane content is reduced as far as possible by employing high reforming temperatures and high steam concentrations to drive the reforming reaction towards completion. However, at the maximum reforming temperatures permitted by available tube construction materials, significant concentrations of methane (e.g., 1–2%) persist in the reformer effluents. At reforming temperatures, the water-gas shift reaction does not even approach completion. The reformer effluent gases therefore contain large amounts of carbon monoxide.

Except for special uses of hydrogen such as the production of methanol synthesis gas, carbon monoxide is an undesirable impurity in the hydrogen and must eventually be removed. In order to minimize the carbon monoxide content of the product gas and obtain a maximum amount of hydrogen, the effluent from the reformer is cooled and passed through at least one stage of "water-gas shift." The stream is passed over a catalyst at about 700–800° F. and the reaction goes almost to completion. The resulting stream may contain 20 percent or more carbon dioxide which along with most of the water is rejected in the acid gas removal step. Conventional methods for carbon dioxide removal include monoethanolamine (MEA) absorption, hot potassium carbonate absorption, and cold methanol wash processes. If still lower concentration of carbon monoxide is required, the thus-purified stream may be reheated to 700–800° F., mixed with steam and passed through a second water-gas shift reaction. A second acid-gas and water removal operation is then required.

After acid gas and water removal the stream may be processed through an additional purification step to remove some particularly undesirable impurity. For example, a methanator may be employed to remove carbon monoxide to very low levels. Methanation is the reverse of the reforming reaction and is promoted over a nickel catalyst at about 800° F.:

$$CO + 3H_2 \rightarrow CH_4 + H_2O \qquad (3)$$

While carbon monoxide can be removed by methanation to only a few parts per million, it increases the methane content by the amount produced in the methanation reaction. Alternatively, a nitrogen washing column may be used to remove methane and carbon monoxide to produce a gas suitable for ammonia synthesis.

In the hydrogen-by-stream reforming process as commercially practiced, an attempt is made to minimize the low boiling impurities in the crude hydrogen delivered from the shift converter. The objectives are to obtain maximum production of hydrogen from hydrocarbon feed processed through the reformer catalyst and to minimize purification problems. Thus the conversion of methane to carbon oxides is carried as far as possible in the reformer and the conversion of carbon monoxide to carbon dioxide is maximized in the shift converter. In order to accomplish this result the reformer furnace is operated at high temperature with high steam concentrations. In many instances more than one stage of water-gas shift conversion is employed. Thus the effluent from the high temperature or "production" end of the process contains very little of the low boiling impurities such as methane and carbon monoxide. The low boiling impurities stream or tail gas which is subsequently removed from the product gas stream is diluted with inerts and has little or no useful value. The expense involved in duplicating the shift converter and acid gas removal equipment is obvious. The cost of operating the reformer at high temperatures and at high steam-to-carbon ratios will be apparent from the following discussion.

As discussed previously, the conditions which promote the reforming reaction are high excess steam, high reforming temperature and low reforming pressure. The first two of these conditions tend to increase the construction and operating costs of reformers. The economic reason for reforming at high pressures is to minimize overall compression costs in the process. An additional advantage of operating at high pressures is that the partial pressure of steam in the product stream is increased. More steam can therefore be condensed at higher temperatures, resulting in more efficient heat recovery.

Coking in a reformer can be avoided by using excess steam. For example, methane can be reformd without coking with a mol ratio of steam to carbon as low as 1.1:1. The previously noted reactions between methane and water show that the ratio of steam to carbon consumed in complete conversion to carbon dioxide is 2:1. In contrast to the minimum steam requirements, present reforming practice employs steam-to-carbon ratios as high as 6:1 in order to drive both the reforming and shift reactions to the right and thereby minimize the methane and carbon monoxide contents of the furnace effluent. At high steam-to-carbon ratios the volume of the excess steam may equal or exceed the volume of the reactants. Operation at high steam-to-carbon ratios is expensive, first because a large excess quantity of high pressure steam must be generated, second because the number and/or size of the catalyst tubes in the reformer must be increased to accommodate the excess steam, third because the excess steam must be superheated to reaction temperature (1400° F.) and fourth because means must be provided to subsequently condense and remove the excess steam.

The reasons why the prior art commercial reforming processes have employed high temperatures and steam-to-carbon ratios are illustrated by quantitative comparisons of the fraction of methane reacted at equilibrium conditions. For example, at 16 atm. pressure and 1500° F. with a steam-to-carbon ratio of 6:1, 0.95 mol of each mol of methane originally present in the feed will have reacted at equilibrium (95% conversion). For the same conditions a steam-to-carbon ratio of 3:1 results in reaction of 0.82 mol of each mol of methane in the feed at equilibrium (82% conversion). By making a simple material balance across the reformer, assuming all reacted methane is converted to carbon dioxide, it is seen that the change in steam-to-carbon ratio from 6:1 to 3:1 results in a change in methane content of the water and carbon dioxide-free effluent from 1.3% to 5.2%. It has been the objective of prior art reformer operation to obtain percentages of methane in the effluent as low as 1.3% or below.

The effect of varying temperature on reformer equilibrium may be similarly evaluated. For example, at a constant pressure of 16 atm. and steam-to-carbon ratio of 3:1, the mols of methane reacted per mol methane in the feed will change from 0.67 to 0.82 as the temperature is increased from 1400° to 1500° F. The effect on the reformer effluent is to decrease the percentage of methane in the water and carbon dioxide-free effluent from 11.0% to 5.2%. The effect of changing the temperature is therefore quite pronounced.

As to the effect of changing the reforming pressure, consider the case of holding the reforming temperature constant at 1400° F. and steam-to-carbon ratio at 3:1. A pressure change from 16 atm. to 26 atm. will decrease the mols of methane reacted at equilibrium per mol methane in the feed from 0.67 to 0.57. The effect on the reformer effluent is to increase the methane therein from 11.0% to 15.9%. While an increase in pressure is obviously detrimental insofar as effluent purity is concerned it is nevertheless economically attractive when product hydrogen is desired at elevated pressures.

In the above three examples we have progressed from one set of extreme conditions with only 1.3% of methane in the reacted gases at equilibrium (after water and carbon dioxide removal) to a contrasting set of extreme conditions producing an equilibrium effluent containing 15.9% methane. Table I summarizes the conditions which produce this progression:

TABLE I

| Steam/Carbon | T. °F. | P. (atmos.) | Percent $CH_4$ Conversion | Percent $CH_4$ in Product |
|---|---|---|---|---|
| 6:1 | 1,500 | 16 | 95 | 1.3 |
| 3:1 | 1,500 | 16 | 82 | 5.2 |
| 3:1 | 1,400 | 16 | 67 | 11.0 |
| 3:1 | 1,400 | 26 | 57 | 15.9 |

The methane contents of Table I reflect a drastic difference in the effectiveness of the reformer and show why it is common practice to use high reforming temperatures and steam-to-carbon ratios.

An object of the present invention is to provide an improved process for producing high purity hydrogen by the general steam reforming technique.

Another object is to provide such a process which does not require the high steam-to-carbon ratios characteristic of the presently used process.

A further object is to provide a process in which the methane portion of the hydrogen product gas may be efficiently recovered and utilized.

Figure 2:
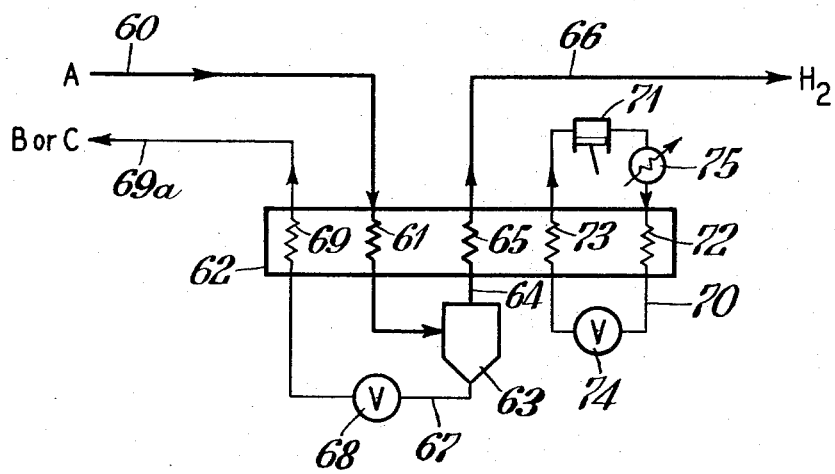
Figure 3:
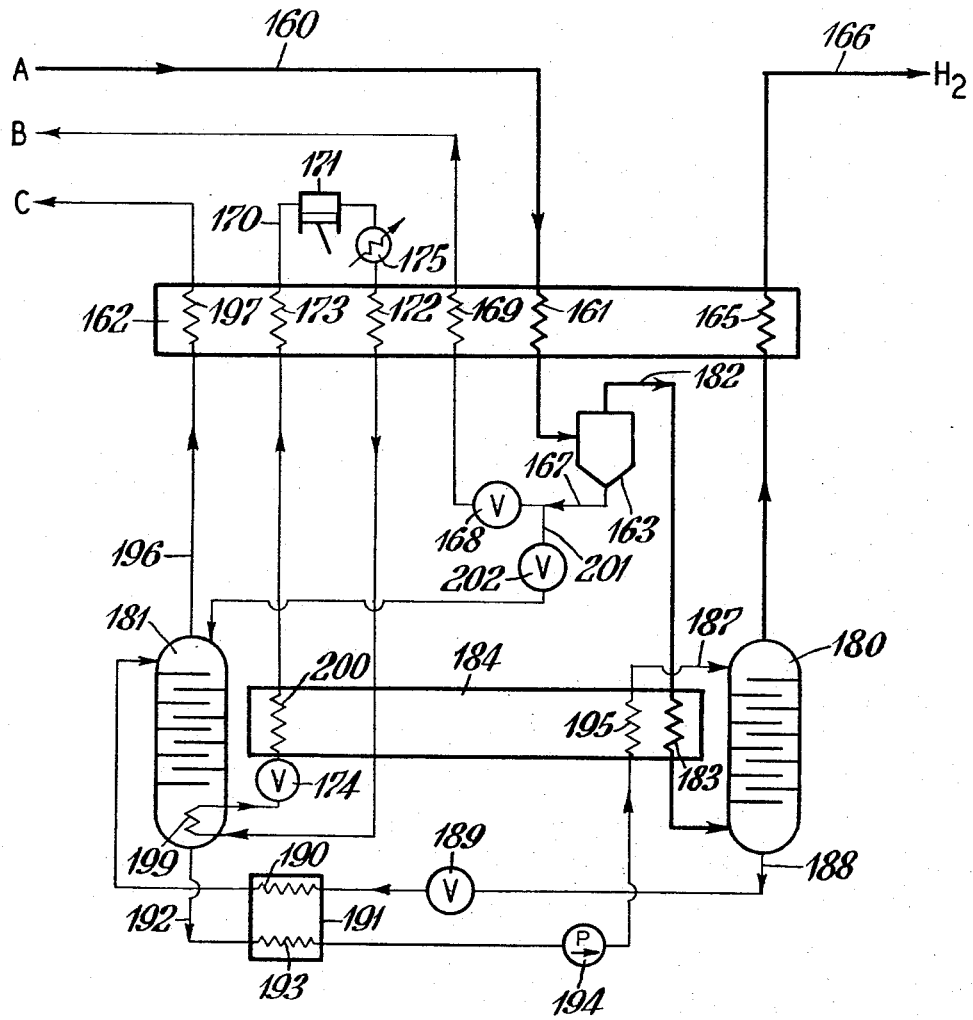

Other objects and advantages of this invention will be apparent from the ensuing disclosure and appended drawings in which:

FIG. 1 is a schematic flowsheet of the reformer-water gas shift converter-acid gas removal sections of apparatus arranged for practicing the invention when joined with either FIG. 2 or 3, FIG. 2 is a schematic flowsheet of hydrogen purification equipment arranged for joining with the FIG. 1 apparatus, and FIG. 3 is a schematic flowsheet of alternative hydrogen purification equipment arrangement for joining with the FIG. 1 apparatus to produce 99% or higher hydrogen.

According to the present invention a steam reformer, water-gas shift converter and acid gas removal system are combined with the efficient hydrogen purifier capable of economically recovering in useful form the unreacted hydrocarbons in the reformer effluent stream. The incompletely reacted hydrocarbons are of such concentration in the recovered tail gas that the stream may be usefully employed in the crude hydrogen production section of the process. Since the incompletely reacted hydrocarbons in the reformer effluent are recoverable in useful form, the reformer need not be operated for maximum conversion of hydrocarbons. A relatively low reforming temperature may be employed together with a low steam-to-carbon ratio. In addition one stage of shift conversion is adequate.

The tail gas recovered from the hydrogen purifier may be employed as feed or fuel for the reformer or as fuel to preheat reactant and/or combustion gases entering the reformer. When the tail gas is used as fuel, it supplies heat to the process gases indirectly and therefore may contain substantial percentages of noncombustible components such as carbon dioxide and nitrogen. These impurities are then rejected from the system in the flue gases. Alternatively the tail gas stream may be recompressed and introduced to the feed stream to the reformer for conversion to hydrogen. In this event the recovered stream should not contain appreciable amounts of carbon dioxide or nitrogen.

In the process of this invention, a low temperature partial condensation step is employed after the water and carbon dioxide have been removed. The condensate provides the additional function of dissolving and removing other low-boiling impurities from the hydrogen gas. For example, nitrogen, carbon monoxide and carbon dioxide all dissolve in methane. The effectiveness of this function is enhanced by partial or incomplete reforming. The benefit obtains from the fact that the hydrogen from the acid gas removal step contains a higher percentage of methane than the prior art process, e.g. 6 mol percent instead of 2 mol percent $CH_4$, so that more solvent is available for washing out the impurities. Moreover, the extra condensate formed is usefully employed as a low temperature refrigerant in the cryogenic purification section of the instant process.

The invention broadly relates to a process for producing high purity hydrogen including the steps of catalytically reacting steam and hydrocarbon-containing feed at elevated pressure of at least 5 atmospheres and a first higher temperature to form carbon monoxide and hydrogen. A hydrocarbon-containing fuel is used to produce the necessary heat for such reaction. The resulting carbon monoxide and remaining steam are then catalytically converted to carbon dioxide and additional hydrogen at a second lower temperature. The carbon dioxide is separated and the hydrogen is dried as the crude product.

The specific novelty includes providing between about 1.5 and 4 mols steam per atom carbon in the hydrocarbon-containing feed for the catalytic reaction step and reacting only about 60–76 mol percent of the hydrocarbon in this feed. Stated in another manner, about 6.5–14 mol percent methane plus carbon monoxide (dry basis) are retained in the product gas from the second lower temperature catalytic conversion step. Next the crude hydrogen containing methane is cooled to below the methane dew point. At least part of any residual carbon monoxide not removed by other means is dissolved in the resulting methane condensate. The methane condensate is separated from the hydrogen vapor and isenthalpically expanded to a lower pressure. The pressure drop during the isenthalpic expansion is preferably sufficient to cool the methane condensate. The expanded methane condensate is heat exchanged with the crude hydrogen to provide at least part of the refrigeration needed for cooling the latter stream below the methane dew point. The methane condensate is simultaneously vaporized during this heat exchange.

The vaporized methane having transferred its refrigeration to the crude hydrogen is recycled to the hydrocarbon containing feed-steam catalytic reaction step and the methane is oxidized therein. The oxidation may occur either in providing the necessary heat for the endothermic reaction or in the reaction itself. That is, the vaporized methane may be recycled as at least part of the hydrocarbon-containing fuel for the reaction or as part of the hydrocarbon feed to the reaction.

In a preferred embodiment about 2–3 mols of steam are provided per atom carbon in the hydrocarbon-containing feed. This particular range allows for most efficient operation of the overall process and in particular the methane consumption per unit volume of hydrogen product gas. For the same reasons it is preferred to convert about 65–70% of the hydrocarbon feed to crude hydrogen.

Referring now to the drawings, FIG. 1 illustrates the reforming-water gas shift reacting-acid gas removing portions of the process. Conventional valving has not been shown in the interest of simplicity, but the use of same will be apparent to those skilled in the art. The feed gas, e.g. natural gas comprising 93.87 mol percent $CH_4$, 5.89% $N_2$, 0.17% $C_2H_5$, 0.04% $C_3H_8$, 0.01% $C_4H_{10}$ and 0.02% $CO_2$ on a dry basis is supplied at 240 p.s.i.g. to conduit 11 and steam at about the same pressure is introduced thereto through conduit 12 in sufficient quantity to provide a ratio of between 1.5 and 4 mols steam per mol carbon in the hydrocarbon feed, e.g. 3:1. The resulting feed mixture is preheated in passageway 13 by the water-gas shift conversion reaction product in heat exchanging passageway 14 to about 750° F. The preheated feed stream then enters reformer 15 and flows through tubes 16 containing a suitable catalyst as for example nickel oxide. The steam-hydrocarbon Reaction 1 occurs therein. Fuel gas to supply heat for this endothermic reforming reaction is provided in conduit 17, preheated in stack gas heat exchanger passage 18, mixed with air and admitted to reformer furnace 15 through burner manifold 19 for combustion in the zone surrounding catalyst-containing tubes 16.

The reformer product gas stream containing primarily hydrogen and carbon monoxide leaves reformer 15 at about 1460° F. and 200 p.s.i.g., and is cooled in heat exchange passage 20 of heat exchanger 21 to about 690° F. before entering the water-gas shift converter 22. If desired additional steam may be added to the cooled reformer product gas mixture through conduit 23. The feed gas mixture to the water-gas shift converter 21 based on the natural gas feed to the reformer comprises 71.2 mol percent $H_2$, 1.7% $N_2$, 11.8% CO, 9.0% $CO_2$ and 6.3% $CH_4$ (dry basis). In this converter the stream contacts a suitable catalyst mass 24 as for example chromium promoted iron oxide, where the carbon monoxide reacts with steam in accordance with Reaction 2 to produce carbon dioxide and additional hydrogen. The water-gas shift conversion reaction is exothermic and the process stream leaves converter 22 at about 790° F. and 197 p.s.i.g. in conduit 25. It is then cooled to about 440° F. in passageway 14 in heat exchange relation with the preheating feed gas mixture and directed through reboiler 26 in the base of acid gas wash liquid regenerator 27. The water-gas shift conversion product gas supplies heat to boil the liquid, e.g. monoethanolamine, in regenerator 27 containing suitable liquid-gas contacting means such as trays. The partially cooled water-gas shift conversion product now at about 260° F. and 192 p.s.i.g. passes consecutively through first water separator 28, cooling passageway 29, second separator 30, cooling heat exchanger 31, and third water separator 32 in order to condense and separate excess steam remaining in the stream. Based on the previously enumerated natural gas feed, the further cooled gas at this point in the process has a composition of 73.8 mol percent $H_2$, 17.2% $CO_2$, 5.7% $CH_4$, 1.7% CO and 1.5% $N_2$. This gas at about 190° F. enters the base of monoethanolamine absorption column 33 at about 185 p.s.i.g. and flows upwardly through suitable liquid-contact devices such as trays against down-flowing liquid monoethanolamine, and leaves the column as effluent A in conduit 34 with a content of 89.2 mol percent $H_2$, 6.9% $CH_4$, 2.05% CO and 1.8% $N_2$ (dry basis). This acid-gas depleted crude hydrogen gas is further cooled in heat exchanger 34a to ambient temperature, directed through separator 34b for water removal and passed through adsorber 34c for a final drying step.

Rich monoethanolamine (having high dissolved carbon dioxide content) is withdrawn from absorption column 33 as bottoms through conduit 35, heated to about 200° F. in passageway 36 and introduced into the top of the monoethanolamine stripping-regenerating column 27. The rich liquid flows downward through the column countercurrent to monoethanolamine vapor generated at the bottom of the column by means of reboiler 26 and is withdrawn as bottoms through conduit 37 essentially free of carbon dioxide. The lean liquid in conduit 37 is partially cooled in passageway 38 by rich monoethanolamine in passageway 36 and further cooled in heat exchanger 39. This further cooled lean wash liquid is then recirculated back to the absorption column 33 through connecting conduit 40 having pump 41 therein. Monoethanolamine vapor escaping from regenerating column 27 in conduit 42 is condensed in heat exchanger 43 by water coolant, separated from the carbon dioxide vapor stream in separator 44 and returned through joining conduit 45 to the recycling lean (purified) monoethanolamine stream in conduit 40. The carbon dioxide vapor is vented from separator 44 through conduit 66.

Steam to operate the process is generated in heat exchanger-boiler 21 using heat available in the cooling of the process gas from reformer temperature (1400–1500° F.) to shift converter temperature (600–700° F.). This steam is withdrawn through conduit 47 and a portion thereof may be used for introduction to the reformer product gas through conduit 23 up-stream of water-gas shift converter 22 as previously described. Another portion of the steam may be mixed with the hydrocarbon feed through conduit 12, also previously described. If necessary, a portion of the steam is diverted from conduit 12 through conduit 48 and passed through second reboiler coil 49 in the base of wash liquid regenerator 27 to assist in boiling the rich monoethanolamine. Steam condensed in coil 49 is clean since it has not been mixed with the process stream. This condensate is withdrawn through conduit 50, introduced to the main water supply conduit 51 and recirculated through pump 52 to heat exchanger-boiler 21. Condensate from separators 28, 30 and 31 is drained through conduits 53, 54 and 55 respectively and treated in water purification unit 56 containing means for degasification and pH control. Makeup water is also introduced to purification unit 56 through conduit 57. The purified water leaves purifier 56 through conduit 58 and is preheated in passageway 59 against the cooling acid gas-free process stream in passageway 29 before joining the second reboiler condensate stream 50 in main water supply conduit 51.

The crude hydrogen formed in the FIG. 1 section of the process is thereafter purified as for example in the purification system illustrated in FIG. 2 for producing hydrogen of 94–98 percent purity, or the more rigorous purification system illustrated in FIG. 3 to produce a product of at least 99 percent purity.

Referring now more specifically to FIG. 2, the crude hydrogen stream A further compressed to about 360 p.s.i.g. by means not illustrated is directed through conduit 60 to passageway 61 in heat exchanger 62 for cooling to below the dew point or condensation temperature for methane, e.g. 110° K. Methane constitutes a major impurity in the crude hydrogen stream and as it condenses in passageway 61 it dissolves portions of other impurities such as nitrogen, carbon monoxide and residual carbon dioxide. The condensed fraction is removed from the hydrogen stream in separator 63 and the cold purified hydrogen gas vented through conduit 64 for warming in passageway 65 in heat exchanger 62. This product hydrogen of 94–98 percent purity is discharged from the system through conduit 65. The condensate is withdrawn through conduit 67 at about 110° K. and throttled through valve 68 to a relatively low pressure, e.g. 6 p.s.i.g. By virtue of this isenthalpic expansion the condensate is cooled at least to about 107° K. The resulting low pressure cold liquid is vaporized and superheated in conduit 69 by heat exchange with the cooling crude hydrogen stream in passageway 61. The vaporized methane is delivered as stream B or C to the reformer 15 of FIG. 1 as described hereinafter.

The throttling of the low boiling impurity-containing methane liquid in valve 68 and its vaporization in heat exchange passageway 69 at reduced pressure provide most of the refrigeration needed for condensing the methane and low-boiling impurities in cooling passageway 61. Any extra refrigeration required by the process is supplied in an auxiliary refrigeration closed circuit 70 consisting of compressor 71, heat exchange passageways 72 and 73, throttling valve 74 and heat exchanger 75. Any suitable refrigerant such as nitrogen may be employed as the work fluid for this auxiliary refrigeration cycle.

In the aforedescribed hydrogen production and purification process the methane condensing in heat exchanger 62 is largely responsible for purifying the product hydrogen owing to the affinity of liquid methane for dissolving other impurities such as nitrogen, carbon monoxide and carbon dioxide in the crude hydrogen stream. As previously indicated the liquefied methane also serves to provide at least most of the low temperature refrigeration required by the process, the refrigerating effect being obtained by revaporizing the condensed impurities at reduced pressure. It will be readily apparent that the amount of additional refrigeration, if any, required from the auxiliary refrigeration circuit 70 will depend directly on the quantity of impurities available at the cold end of the process for heat pumping. Thus, from the view points of both hydrogen product purity and operating economy it is necessary that the crude hydrogen stream contain sufficient quantity of methane for achieving these objectives. We have found that the shift converter product in conduit 25 should contain between about 6.5 and 14 mol percent unconverted carbon in the form of methane plus carbon monoxide, and preferably about 10 mol percent unconverted carbon to perform the above stated functions. If the converter product stream contains more than about 14 mol percent unconverted carbon, there is more $CH_4$ available in the tail gas B or C than can be efficiently utilized as reformer fuel, and the balance must be recompressed for use as reformer feed. The specific methane content of this stream is determined by the degree of conversion achieved in the reforming furnace 15, and therefore the effectiveness of the FIG. 2 cryogenic purification section is dependent on operating conditions employed in the reformer.

The additional features in the cryogenic hydrogen purification section shown in FIG. 3 permit the production of a 99 percent or higher hydrogen product. In general the section employs a methane absorption column 180 with its auxiliary methane refrigeration column 181. The higher washing rates, the cleaner wash liquid and the more effective gas-liquid contact obtained in column 180 permit the removal of essentially all impurities with the exception of perhaps 1 percent methane in the product hydrogen discharged through conduit 166. As in FIG. 2 the process is arranged to permit the withdrawal of a methane-rich condensate from separator 163 which is throttled, vaporized, rewarmed and delivered as stream B to supplement hydrocarbon feed gas in conduit 11 of FIG. 1.

The crude hydrogen gas at about 360 p.s.i.g. is introduced as stream A to conduit 160, cooled to below the methane dew point in conduit 161 of first heat exchanger 162 e.g. to 111° K. and passed to separator 163. The methane-rich condensate is withdrawn through conduit 167, a portion thereof is throttled through valve 168 and revaporized and superheated in heat exchange passageway 169. The resulting methane vapor is then processed as stream B having a composition of about 92.8 mol percent $CH_4$, 2.1% $H_2$, 3.1% $CO$, and 2.0% $N_2$ based on the FIG. 1 natural gas feedstock example.

The low boiling impurity-containing hydrogen vapor from separator 163 is discharged through conduit 182 and further cooled and partially condensed in passageway 183 of second heat exchanger 184 to about 93° K. The further cooled low boiling impurity-containing hydrogen stream at about 354 p.s.i.g. is introduced into methane absorption column 180 at the lower end thereof. At the same time lean methane wash liquid is introduced to absorption column 180 at the upper end thereof through conduit 187. The liquid and vapor flow in countercurrent relation enhanced by suitable liquid-vapor contacting means such as trays, and the resulting rich (low boiling impurity-containing) methane wash liquid is withdrawn from the lower end of absorption column 180 through conduit 188. The cold hydrogen product gas discharged from the upper end of column 180 into conduit 166 is warmed to about ambient temperature in passageway 165 of first heat exchanger 162 and thereby transfers its refrigeration to the cooling crude hydrogen in passageway 161. The rich wash liquid at for example 96° K. and 354 p.s.i.g. is throttled to a low pressure of about 5 p.s.i.g. through valve 189 and warmed to about 106° K. in passageway 190 of heat exchanger 191. The partially rewarmed low pressure rich methane wash liquid is then introduced through conduit 188 to the top of regeneration column 181 where it flows downward countercurrent to clean methane vapors boiling up from the kettle of such column. The methane is thus freed of lower boiling impurities such as nitrogen and carbon monoxide, and lean methane liquid is withdrawn through conduit 192, recooled in passageway 193 of heat exchanger 191 against the throttled rich methane liquid in passage 190, and repressurized to about 354 p.s.i.g. in pump 194. The repressurized lean methane wash liquid is subcooled in passageway 195 of second heat exchanger 184 to about 93° K. and returned to the top of methane absorption column 180 through conduit 187. The low boiling impurity-containing vapor having a composition of about 17 mol percent $H_2$, 53% $CH_4$, 16% $CO$ and 14% $N_2$ is vented from the top of methane regeneration column 181 through conduit 196 at about 106° K. and warmed in heat exchange passageway 197 of first heat exchanger 162 to about 298° K. The further warmed low boiling impurity-containing stream is then directed as stream C to the reformer fuel conduit 17 (see FIG. 1).

Refrigeration not supplied by liquefied methane is provided in the closed circuit 170 containing compressor 171. The pressurized refrigerant as for example nitrogen is partially cooled in heat exchanger 175, further cooled in passageway 172 of first heat exchanger 162 to a temperature of about 130° K. at pressure of about 357 p.s.i.g. and condensed in reboiler coil 199 in the base of methane regeneration column 181. The refrigerant liquid is then throttled through valve 174 to about 40 p.s.i.g. and simultaneously cooled to about 90° K. This cold low pressure refrigerant liquid flows through passageway 200 of second heat exchanger 184 to further cool and partially condense the low boiling impurity-containing vapor in passageway 183 and is itself partially rewarmed. The latter stream is further rewarmed in passageway 173 of first heat exchanger 162 for completion of the closed refrigerant circuit 170. In this manner the refrigerant transfers its refrigeration to the crude hydrogen stream in passageway 161.

The methane content of the pressurized crude hydrogen feed stream 160 contributes materially to the refrigeration supply for the FIG. 3 embodiment. The methane condensed in passageway 161 and vaporized at reduced pressure in passageway 169 provides relatively high level (warm) refrigeration for the process. That fraction of the methane condensed at lower temperature in exchange passageway 183 of second heat exchanger 184, is vented as a lower pressure vapor from the methane regeneration column 181 and its refrigeration is recovered in first heat exchanger 162 before leaving the system.

It should be understood that in order for the FIG. 3 system to maintain the required liquid methane inventory for the wash column 180 a balance must be held between the methane permitted to vent through conduit 196 and the methane condensed in passageway 183. If surplus methane condensate is available from separator 163 in conduit 167, the balance may be diverted through branch conduit 201, throttled in valve 202 and introduced at the upper end of methane regeneration column 181. In sufficient methane in the crude hydrogen feed 160 for condensation in passageway 183 will necessitate recondensation of methane from the vent gas leaving regeneration column 181, resulting in higher investment and operating cost. Thus, it will be clear that the FIG. 3 system, like the previous FIG. 2 embodiment, is dependent upon ample methane content in the crude hydrogen feed, i.e. between 6.5 and 14 mol percent unconverted carbon in the water-gas shift conversion product gas.

The crude hydrogen cryogenic purification system of FIG. 3 may be further modified to produce still higher purity hydrogen on the order of 99.999 percent suitable for liquefaction. This modification may comprise the addition of a liquid propane wash column in series flow relationship with the methane absorption column 180 in the manner described in U.S. Patent 3,073,093 to C. R. Baker et al. The low vapor pressure propane wash liquid operating at low temperature and at economically low liquid recirculation rate effectively reduces the residual low boiling impurities in the product hydrogen to only a few parts per million.

It has been previously indicated that one object of the present invention is to employ the effluent or tail gas streams recovered from the hydrogen purification step, for useful purposes in the hydrogen production step of the process. The method of such utilization of the methane tail gas will be understood by matching the streams designated B and C on FIG. 1 with streams similarly designated in FIGS. 2 and 3. Referring to FIG. 1, stream B represents a tail gas substantially free of inert impurities such as nitrogen and carbon dioxide and suitable for recirculation to the hydrocarbon feed stream entering the reformer 15 through conduit 11. Stream C represents a tail gas which, due to its substantial content of inert gases and other diluents is preferably employed as a portion of the fuel introduced through conduit 17 and used for combustion in the reformer 15 to supply indirect heat for the endothermic reaction.

The ability to recirculate the tail gas to the reformer feed, as in stream B, depends upon its content of unwanted impurities such as nitrogen and upon the capability of the crude hydrogen purification system (FIG. 2 or 3) to reject such impurities at other points in the process. Recirculating an inert impurity to the reformer hydrocarbon feed results in the impurities accumulation in the system, and the accumulation must be controlled so that the impurity limits in the product are not exceeded. Referring to FIG. 2, the tail gas stream 69a may be recompressed by means not shown from its low pressure of about 4 p.s.i.g. to reformer feed pressure of about 240 p.s.i.g. and used as stream B—a portion of the hydrocarbon feed to the reformer Alternatively, the tail gas stream 69a may be used at its existing low pressure as fuel stream C or it may be divided and used for both purposes. The capability of the FIG. 2 embodiment to remove low boiling impurities such as nitrogen, carbon monoxide and argon is limited. This purification is preferred when such impurities do not constitute a serious problem either because they are not present in significant amounts in the reformer feed or that they are tolerable in the hydrogen product.

Referring again to FIG. 3, two tail gas streams B and C are recoverable. Stream B is usually most suitable as reformer feed because it derives from liquid condensed at a relatively warm temperature level and contains very little low boiling impurity. Stream C from methane regeneration column 181 contains most of the low boiling impurities which may be rejected from the overall process by employing the stream as reformer fuel. Different pressure levels of streams B and C may also determine preferred uses of the streams. For example if stream B is only partially throttled at valve 168 it will be preferable to recompress this stream to reformer feed pressure instead of stream C from lower pressure. The lower pressure tail gas needs very little recompression for use as fuel.

In summary the ability to recover in useful form the carbon values from the reformer effluent stream makes it possible to obtain significant economies in the design and operation of the reformer and converter portions of the system. The reformer, shift converter and associated heat exchange equipment can be decreased in size and cost, and service life of the high temperature components of the plant should be substantially improved. The increased methane content of process gas, resulting from "mild" or "partial" reforming is advantageously used to sustain a cryogenic purifier by supplying needed refrigeration and by serving as addition solvent for other impurities.

Certain of these unexpected improvements are empirically demonstrated by the Table II summary which compares the operation of hydrogen production-purification plants operating in accordance with the prior art process and the present invention. In each instance the hydrocarbon feed is natural gas and the product is hydrogen of above 94% purity.

The first two sets of data (Plant Nos. 1 and 2) demonstrate the advantage of performing the reforming reaction (1) and water-gas shift reaction (2) under relatively mild conditions, i.e. steam/carbon ratio of 3.0 instead of 5.6, 76% hydrocarbon feed conversion to hydrogen, and 7.4 $CH_4$+CO mol percent in the shift conversion product gas. The important difference between the two Plants is the reduced steam which has been utilized in Plant No. 2 without detriment to the overall hydrocarbon conversion efficiency. This reduced steam requirement is reflected in the total methane consumption of the process. Plant No. 2 requires only 430/510 or 84.5% of the total methane required by Plane No. 1 to produce 1000 cu. ft. product hydrogen—a very significant economy.

The effect of increasing the unconverted hydrocarbon in the shift converter effluent is seen by comparing the quantities of methane added from outside source as combustion fuel. In Plane No. 2 a much larger fraction of the total hydrocarbon requirement is introduced as feed and the recirculated unconverted fraction provides most of the fuel requirements. In Plane No. 1 the small, 3.3 mol percent $CH_4+CO$ unconverted fraction provides very little of the fuel which must be supplied primarily from outside source.

While Plane No. 2 represents considerable improvement over Plane No. 1 it nevertheless retains certain less-than-desirable features including introduction of additional steam after the reformer as shown in stream 23 of FIGURE 1. Further improvement can be obtained by introducing the total steam requirement of the process through the reformer and by adjusting temperature to increase the unconverted $CH_4+CO$ so that it matches the fuel requirement. The effect is shown in the third set of data (Type 3) of Table II, where 60% of the hydrocarbon feed is converted to product hydrogen rather than 76% and where the shift conversion product contains 13.8 $CH_4+CO$ mol percent, close to the 14% upper limit. The methane required from an external source for combustion has been reduced to 0, and the recycle stream C provides exactly the required quantity of combustion fuel to supply the process heat.

Type 4 represents a close-to-optimum use of this invention with 70% hydrocarbon feed conversion to hydrogen product and minimum steam consistent with process requirements. Again no external fuel is supplied for fuel in the reformer. Under these conditions a plant would consume only 360/510 or 70.5% of the methane used in Plant No. 1 to produce 1,000 cu. ft. product hydrogen.

ance with endothermic Reaction 1 and without direct addition of a free oxygen-containing gas. The secondary reformer receives the product of Reaction 1 as well as unreacted hydrocarbon-containing feed and steam. Free oxygen-containing gas is also introduced to supply heat for decomposing at least part of the remaining hydrocarbon feed. This oxidation reaction is exothermic and sufficient free oxygen is provided to maintain the temperature level needed for the endothermic steam reforming Reaction 1. The secondary reformer product is then directed to the water-gas shift reactor. The aforedefined process limitations thus apply to a combination of the two reformers. For example only about 60–76% of the hydrocarbon content of the feed to the primary reformer is reacted in the primary and secondary reformers.

We also contemplate that the entire hydrocarbon conversion may be conducted in a secondary-type reformer. In this instance process heat is supplied by reaction of a portion of the feed with free-oxygen, the oxygen being introduced and admixed with the steam and feed in the reactor. The recycled methane from the crude hydrogen purification section comprises a part of the hydrocarbon consumed in the reactions.

What is claimed is:

1. In a process for producing high purity hydrogen by the steps of catalytically reacting steam and hydrocarbon-containing feed at elevated pressure of at least 5 atmospheres and a first higher temperature to form carbon monoxide and hydrogen using a hydrocarbon-containing fuel to provide the necessary heat for such reaction, catalytically converting steam and said carbon monoxide to carbon dioxide and hydrogen at a second lower temperature, separating and drying said hydrogen as crude product, the improvement comprising:

(a) providing between about 1.5 and 4 mols steam per atom carbon in said hydrocarbon-containing feed for the catalytic reaction step and reforming only about 60–76 mol percent of the hydrocarbon in said feed, (b) cooling the crude hydrogen containing methane to below the methane dew point, (c) isenthalpically expanding the methane condensate to a lower pressure, (d) heat exchanging the expanded methane condensate with said crude hydrogen to provide at least part of the refrigeration for cooling step (b) while simultaneously vaporizing the methane condensate, and (e) recycling the vaporized methane from step (d) to the hydrocarbon-containing feed-steam catalytic reaction step and oxidizing said methane.

2. A process according to claim 1 in which said vaporized methane from step (d) is recycled as at least part of said hydrocarbon-containing fuel for the hydrocarbon containing feed-steam catalytic reaction step.

3. A process according to claim 1 in which said vaporized methane from step (d) is recycled as part of the hydrocarbon feed for said hydrocarbon containing feed-steam catalytic reaction step.

4. A process according to claim 1 in which about 2–3

TABLE II

| Type | Percent HC Feed Converted to H² | HC Feedstream Reaction Temp. (° F.) and Pressure | Steam: Carbon Ratio | CH₄ plus CO Molar Percent in Shift Conversion Product | Cu. ft. CH₄ Combustion Fuel added/ 1,000 cu. ft. H₂ | Cu. ft. CH₄ Consumed/ 1,000 cu. ft. H₂ |
|---|---|---|---|---|---|---|
| (1) Prior Art Plant No. 1 | 92 | 1,425 (12.7 atm.) | ¹ 5.6 | 3.3 | 220 | 510 |
| (2) Plant No. 2 using invention | 76 | 1,460 (17.3 atm.) | ¹ 3.0 | 7.4 | 71 | 430 |
| (3) Invention with minimum feed conversion of H₂ | 60 | 1,350 (17.3 atm.) | ¹ 3.7 | 13.8 | 0 | 417 |
| (4) Near optimum use of invention | 70 | 1,420 (17.3 atm.) | ² 2.7 | 7.9 | 0 | 360 |
| (5) Invention with higher conversion pressures | 73 | 1,580 (16 atm.) | ¹ 1.7 | 6.9 | 0 | 343 |
| | 67 | 1,500 (21 atm.) | ¹ 2.2 | 9.0 | 0 | 373 |
| | 63 | 1,420 (26 atm.) | ¹ 3.1 | 10.5 | 0 | 397 |

¹ Based on 80% thermally efficient reformer furnace.
² Based on 90% thermally efficient reformer furnace.

Type V illustrates that even at higher pressures apt to be employed in future reformers this invention still achieves high efficiencies. Despite the adverse effects of increased pressure and reduced steam on the reformer reaction the invention economically recovers and recycles the increased unconverted fraction, and maintains high methane efficiency. It will be noted also that with progressively higher pressures it is also necessary to reduce reformer temperatures so as not to exceed the metallurgical limitations of commercially available reformer furnace construction materials. This further tends to inhibit the conversion reaction.

Although particular embodiments of this invention have been described in detail, it is contemplated that modifications of the process may be made and that some features may be employed without others, all within the scope of the invention.

Although the invention has been specifically described in terms of a single reformer in which the hydrocarbon-containing feed and steam are the sole reactants, it is contemplated that the reforming step may comprise two reformers in series relationship. In this embodiment the primary reformer operates as previously described in accordmoles of steam are provided per atom carbon in said hydrocarbon-containing feed.

5. A process according to claim 1 in which about 65-70% of said hydrocarbon feed is converted to crude hydrogen.

6. A process according to claim 1 in which about 2-3 moles of steam are provided per atom carbon in said hydrocarbon feed, and about 65-70% of the feed is converted to crude hydrogen.

7. A process according to claim 1 in which said methane condensate is isenthalpically expanded to sufficiently lower pressure to cool the condensate.

8. A process according to claim 1 in which said vaporized methane from step (d) is recycled as all of said hydrocarbon-containing fuel for the hydrocarbon containing feed-steam catalytic reaction step.

9. A process according to claim 1 in which said expanded methane condensate from step (c) provides only part of the refrigeration needed for the crude hydrogen-methane cooling and condensation step (b), and the balance of said refrigeration is provided by a closed refrigerant circuit.

10. A process according to claim 1 in which the crude hydrogen cooled in step (b) contains residual carbon monoxide and at least part of said carbon monoxide is dissolved in the methane condensate by virtue of said cooling.

11. A process according to claim 10 including the steps of:
(f) further cooling hydrogen vapor containing uncondensed methane and undissolved residual carbon monoxide from methane condensation step (b) to condense said uncondensed methane,
(g) contacting such further cooled fluid with substantially pure methane wash liquid thereby transferring said undissolved residual carbon monoxide to the wash liquid and cleaning said further cooled hydrogen,
(h) heat exchanging said further cooled hydrogen with said crude hydrogen to provide another part of the refrigeration for cooling step (b),
(i) discharging the warmed carbon monoxide-free hydrogen from heat exchange step (h) as the high purity hydrogen product.

12. A process according to claim 10 including the steps of:
(f) further cooling hydrogen vapor containing uncondensed methane and undissolved residual carbon monoxide from methane condensation step (b) to condense said uncondensed methane,
(g) contacting such further cooled fluid with substantially pure methane wash liquid thereby transferring said undissolved residual carbon monoxide to the wash liquid and cleaning said further cooled hydrogen,
(h) heat exchanging said further cooled hydrogen with said crude hydrogen to provide another part of the refrigeration for cooling step (b),
(i) discharging the warmed carbon monoxide-free hydrogen from heat exchange step (h) as the high purity hydrogen product,
(j) expanding and warming the carbon monoxide-containing methane wash liquid from step (g),
(k) partially vaporizing the expanded and warmed carbon monoxide-containing methane wash liquid from step (j) and passing the vapor in countercurrent contact with the remaining wash liquid thereby transferring the carbon monoxide to said vapor,
(l) recooling the carbon monoxide-free methane wash liquid from step (k) to a temperature below the methane dew point, and returning the recooled liquid to step (g) as said substantially pure methane wash liquid,
(m) heat exchanging the carbon monoxide-containing methane vapor from step (k) with said crude hydrogen to provide still another part of the refrigeration for cooling step (b), and
(n) recycling the warmed carbon monoxide-containing vapor from step (m) as at least part of the combustion fuel for said hydrocarbon feed-steam catalytic reaction.

13. A process according to claim 10 in which said vaporized methane from step (d) is recycled as part of the hydrocarbon feed for said hydrocarbon-containing feed-steam catalytic reaction step.

References Cited

UNITED STATES PATENTS

| 2,983,585 | 5/1961 | Smith | 23—213 |
| 3,180,709 | 5/1965 | Yendall et al. | 23—210 |
| 3,297,408 | 1/1967 | Marshall | 23—212 |

MILTON WEISSMAN, *Primary Examiner.*

EDWARD STERN, *Examiner.*